United States Patent [19]
Dunham

[11] Patent Number: 5,681,189
[45] Date of Patent: Oct. 28, 1997

[54] THREAD PROTECTORS

[75] Inventor: David Edward Dunham, Pine City, N.Y.

[73] Assignee: Augat Inc., Mansfield, Mass.

[21] Appl. No.: 528,352

[22] Filed: Sep. 14, 1995

[51] Int. Cl.⁶ .................................................. H01R 13/42
[52] U.S. Cl. .......................... 439/738; 439/271; 439/737
[58] Field of Search ................................. 439/730, 752, 439/737, 738, 932, 734, 735, 271, 578

[56] References Cited

U.S. PATENT DOCUMENTS

| | | | |
|---|---|---|---|
| 1,042,747 | 10/1912 | Ziegler | 439/738 |
| 2,145,744 | 1/1939 | Whitney | 439/738 |
| 3,413,591 | 11/1968 | Hergenham | 439/737 |
| 3,925,596 | 12/1975 | Siden | 174/68.5 |
| 4,384,404 | 5/1983 | Watine | 29/871 |
| 4,624,990 | 11/1986 | Lunk et al. | 525/199 |
| 4,650,228 | 3/1987 | McMills et al. | 285/381 |
| 4,674,818 | 6/1987 | McMills et al. | 439/275 |
| 4,717,355 | 1/1988 | Mattis | 439/452 |
| 4,859,836 | 8/1989 | Lunk et al. | 219/548 |
| 4,869,679 | 9/1989 | Szegda | 439/272 |
| 4,998,894 | 3/1991 | Gronvall | 439/521 |
| 5,002,503 | 3/1991 | Campbell et al. | 439/578 |
| 5,173,573 | 12/1992 | Jervis | 174/138 |
| 5,277,598 | 1/1994 | McMills et al. | 439/133 |
| 5,295,864 | 3/1994 | Birch et al. | 439/578 |
| 5,297,972 | 3/1994 | McMills et al. | 439/133 |
| 5,347,084 | 9/1994 | Roney et al. | 174/92 |
| 5,362,250 | 11/1994 | McMills et al. | 439/387 |

FOREIGN PATENT DOCUMENTS 2202393  9/1988  United Kingdom ................... 439/952

*Primary Examiner*—J. J. Swann
*Attorney, Agent, or Firm*—Weingarten, Schurgin, Gagnebin & Hayes

[57] ABSTRACT

A thread protector system includes one or more thread protectors, each thread protector including an axially compressible tube with a tapered central passageway and a tapered exterior surface.

7 Claims, 4 Drawing Sheets

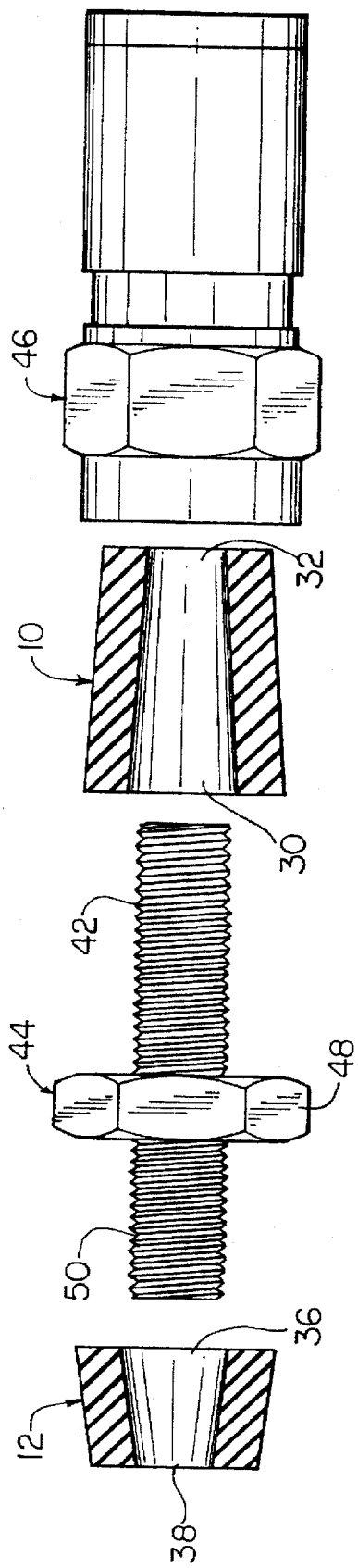
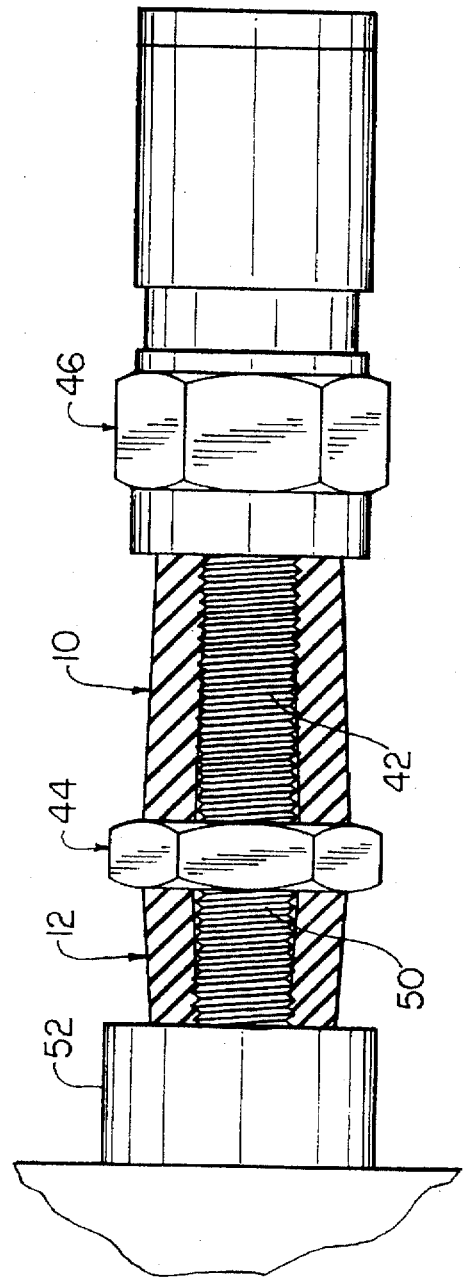
FIG. 5
FIG. 6

THREAD PROTECTORS

FIELD OF THE INVENTION

The present invention relates to flexible sealing elements, and more particularly to thread protectors for coaxial cable connections.

BACKGROUND OF THE INVENTION

Sealing elements, such as thread protectors, are known for covering the threaded portions of coaxial connectors to provide an environmental seal. Some thread protectors are configured for particular connectors or connector adapters. However, the very particularized features of these protectors render them inoperative for other than one connector size, style, or application.

Also, known thread protectors are difficult to install on connector or adapter threads because the protectors have a uniform bore which must be stretched to a diameter greater than the threads along the entire length of the protector, following which the threaded portion is inserted through the protector. When the outward, radial tension is removed from the protector it contracts radially about the threads. This type of thread protector is also difficult to reposition. Also, the smooth exterior surface of known thread protectors renders them difficult to handle and manipulate. Furthermore, known thread protectors do not provide good end seals.

SUMMARY OF THE INVENTION

The present invention overcomes the limitations of present thread protectors by providing a thread protector system including one or more thread protectors, each thread protector having an axially compressible tube with a tapered central passageway and a tapered exterior surface. The thread protector system is easy to handle, manipulate, install, and adjust; and it provides superior end seals and environmental protection.

In an illustrative embodiment, a thread protector comprises a resilient tube defining a thread passageway having an axis of symmetry, a first outer diameter, and a first inner diameter. The first inner diameter converges to an opening having a second inner diameter that is smaller than the first inner diameter. The tube has a second outer diameter that is smaller than the first outer diameter.

BRIEF DESCRIPTION OF THE DRAWINGS

These and further features of the invention will be better understood with reference to the accompanying specification and drawings in which:

FIG. 5 is an exploded side view of an exemplary cable connection provided with the thread protector system, wherein the thread protectors are illustrated in cross-section;

FIG. 6 is a side view of the cable connection of FIG. 5, which illustrates the thread protectors in a non-compressed state.

DETAILED DESCRIPTION OF THE INVENTION

Figure 1:
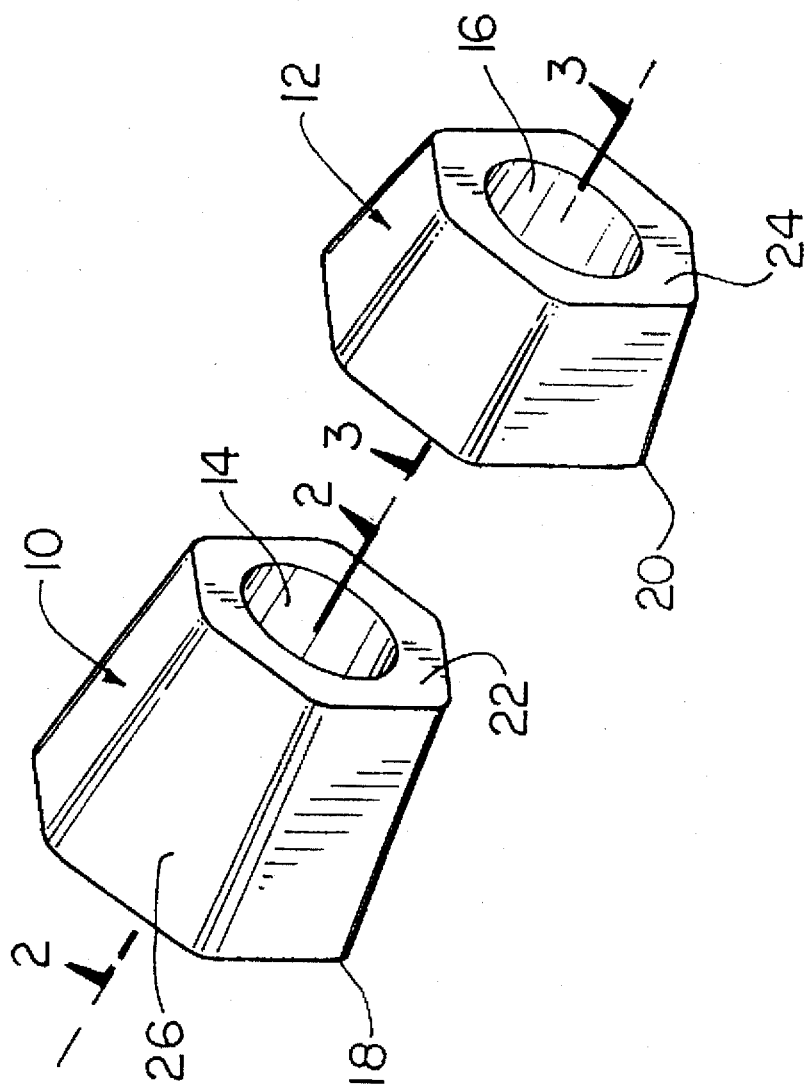
FIG. 1 is a perspective view of a thread protector system in accordance with the invention.

Referring to FIG. 1, a thread protector system is illustrated comprising a first thread protector 10 and a second thread protector 12. Each of the thread protectors 10, 12 comprises an elastomeric sleeve or resilient tube having a smooth, frustoconical thread passageway 14 and 16, respectively, therethrough. Each thread passageway 14, 16 converges from an opening on a first end of the tube 18 and 20, respectively, to a smaller opening on a second end of the tube 22 and 24, respectively, opposite the first end. The exterior of each thread protector 10, 12 is tapered so that they have a greater diameter at the first end 18, 20 than at the second end 22, 24.

The exterior surface of the thread protectors 10, 12 can include flat portions or faces 26 which facilitate grasping and twisting the respective thread protector. In the illustrated embodiment, each of the thread protectors 10, 12 has an exterior surface with six faces 26; however, more or less faces are contemplated and are compatible with the concept of the invention.

Figure 2:
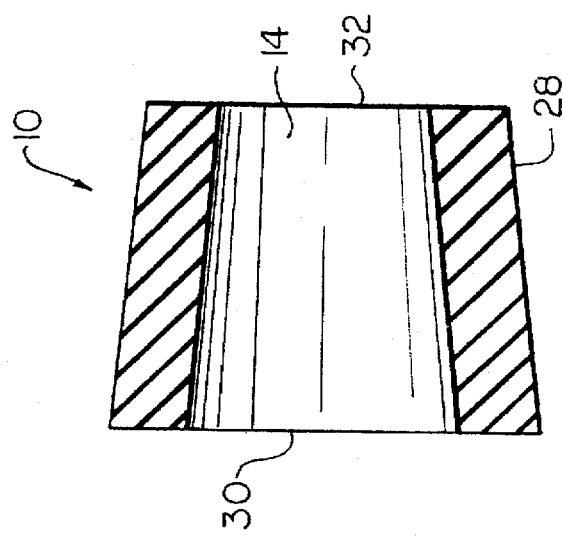
FIG. 2 is a sectional view of an individual thread protector of the system illustrated in FIG. 1, taken along line 2—2.

Referring to FIG. 2, a cross-sectional view of the first thread protector 10 clearly illustrates the smoothly tapered interior thread passageway 14 and a tapered exterior surface 28. In an exemplary embodiment of the first thread protector 10, the first or larger opening 30 is approximately 0.344 inches in diameter, and the second or smaller opening 32 is approximately 0.270 inches in diameter. The first thread protector 10 is approximately 0.420 inches long, and the surface of the thread passageway 14 has a taper or angle of convergence of approximately five degrees with respect to the axis of symmetry of the first thread protector, which is collinear with the centerline of the thread passageway 14.

Figure 3:
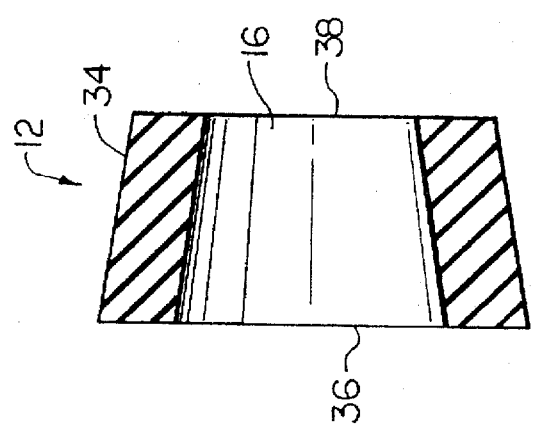
FIG. 3 is a sectional view of a second thread protector of the system illustrated in FIG. 1, taken along line 3—3.

Similarly, FIG. 3, a cross-sectional view of the second thread protector 12, illustrates a tapered interior thread passageway 16 and a tapered exterior surface 34. In an exemplary embodiment of the second thread protector 12, the first or larger opening 36 is approximately 0.313 inches in diameter, and the second or smaller opening 38 is approximately 0.270 inches in diameter. The second thread protector 12 is approximately 0.245 inches long, and the surface of the thread passageway 16 has a taper or angle of convergence of approximately five degrees with respect to the axis of symmetry of the second thread protector which is collinear with the centerline of the passageway.

Figure 4:
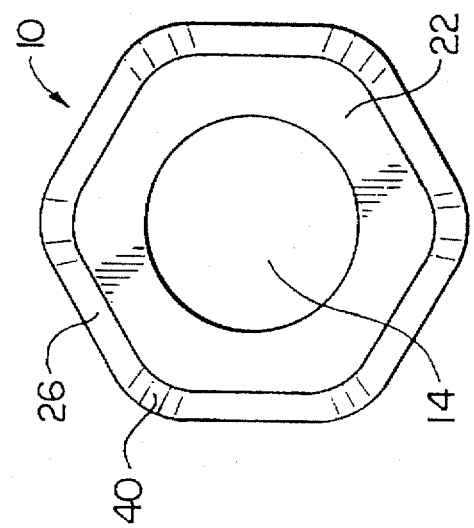
FIG. 4 is an end view of the thread protector of FIG. 2.

FIG. 4 is an end view of the first thread protector 10 at the second end 22. The second thread protector 12 has a substantially identical appearance when viewed from its second end 24 and is therefore not depicted. In this illustration the flattened portions or faces 26 are readily apparent. Abutting flattened faces 26 can be blended together with curved surfaces 40. The second end 22, like the first end 18, is smooth and provides a large end sealing surface, as well as ample room for product identification markings that are hidden from view when the thread protectors are installed as described below.

The exemplary dimensions are for a thread protector system configured for a standard adapter for a coaxial connector, wherein the adapter has two threaded portions requiring environmental protection. However, depending on the application and the adapter used, the thread protector system can include only one or more than two thread protectors dimensioned accordingly.

FIG. 5 is an exploded view of a thread protector system having the first thread protector 10 axially aligned with a first threaded portion 42 of an adapter 44 securable to a coaxial cable connector 46. The adapter 44 includes a nut 48 to facilitate twisting the adapter. The adapter 44 has a second threaded portion 50 on the opposite side of the nut 48 from the first threaded portion 42, that is axially aligned with the second thread protector 12.

Because the first openings 30 and 36 of the first and second thread protectors 10 and 12 can be larger than the diameter of the threaded portions 42 and 50, the thread protectors are easily pushed onto the adapter 44. The second openings 32 and 38 of the first and second thread protectors can also be larger than the diameter of the threaded portion 42 and 50 to make insertion of the threaded portions through the respective thread passageways even easier.

FIG. 6 illustrates first and second thread protectors 10 and 12 positioned on the adapter 44. The adapter 44 is depicted not yet screwed into the coaxial cable connector 46 or a device 52 to show the first and second thread protectors 10 and 12 in a first or non-compressed state. Because the thread protectors 10 and 12 of this embodiment of the thread protector system have thread passageways 14, 16 that are wider than the threaded portions 42, 50 of the adapter 44, the spaces between some of the threads are not yet filled with the material of the thread protectors.

Figure 7:
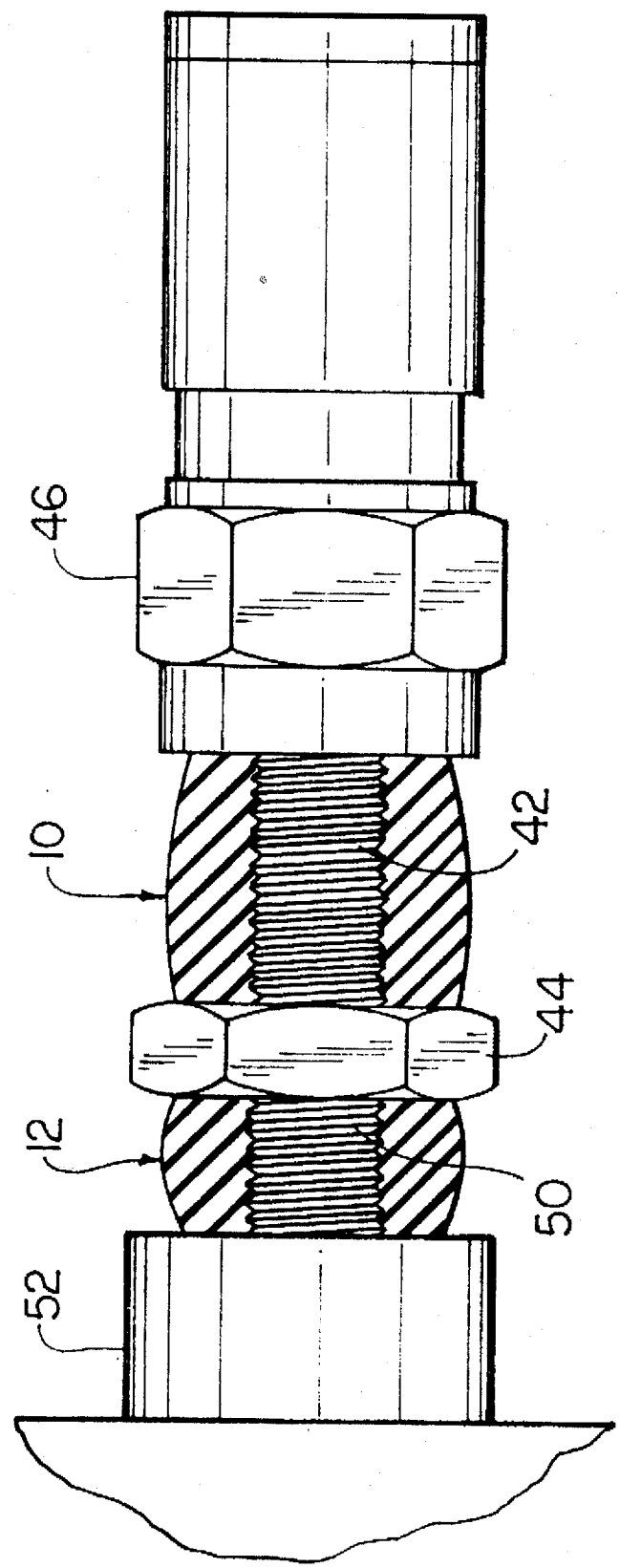
FIG. 7 is an illustration of the cable connection of FIG. 6, wherein the cable connection is tightened, thereby compressing the thread protectors.

Referring now to FIG. 7, the adapter 44 is screwed into the coaxial cable connector 46 and the device 52 to show the first and second thread protectors 10 and 12 in a second or compressed state. In the compressed state, the thread protectors 10 and 12 provide secure, fluid-tight end seals. In addition to providing good end seals, axial compression of the thread protectors 10 and 12 causes them to bulge radially, thereby providing a radial seal around at least a part of the length of the threaded portions 42 and 50.

An exemplary material for the thread protectors 10 and 12, that is readily compressed, and which has good sealing properties is injection-moldable grade, thermoplastic rubber, such as UV grade Sarlink. This material is particularly desirable as it is easy to work with and because it is resistant to ultraviolet and ozone rich environments. Furthermore, this material having the above-identified dimensions is sufficiently robust that it will not fold over, roll-up, or tear as the threaded portions 42 and 50 are pushed through the thread passageways as described above, even when a portion of each passageway is narrower than the threaded portions.

Although the invention has been shown and described with respect to exemplary embodiments thereof, various other changes, omissions and additions, in form and detail thereof may be made therein without departing from the spirit and scope of the invention.

What is claimed is:

1. A thread protector system comprising:
   a resilient sleeve having a first end and a second end, said sleeve having a larger diameter at said first end than at said second end, said first end defining a first opening in said sleeve and said second end defining a second opening in said sleeve, said first opening being larger than said second opening, and a frustoconical passageway through said sleeve leading from said first opening to said second opening;
   wherein said sleeve has an exterior surface including a plurality of flat faces; and
   wherein abutting ones of said plurality of flat faces are joined by a curved exterior surface.

2. The thread protector system of claim 1, wherein said passageway has an axis of symmetry collinear with an axis of symmetry of said sleeve.

3. The thread protector system of claim 1, wherein said frustroconical passageway of said first thread protector is defined by a smoothly tapered interior surface of said sleeve.

4. The thread protector system of claim 3, wherein said first thread protector has an axis of symmetry and wherein said frustoconical passageway is tapered five degrees with respect to said axis of symmetry.

5. The thread protector system of claim 1, wherein said first thread protector sleeve comprises an injection-moldable, thermoplastic rubber.

6. The thread protector system of claim 1, wherein said first end of said first thread protector provides a first sealing face and said second end of said first thread protector provides a second sealing face, said first sealing face being parallel with said second sealing face.

7. The thread protector system of claim 1, further comprising a second thread protector including a resilient sleeve having a first end and a second end, said sleeve having a larger diameter at said first end than at said second end, said first end defining a first opening in said sleeve and said second end defining a second opening in said sleeve, said first opening being larger than said second opening, and a frustoconical passageway through said sleeve leading from said first opening to said second opening, said passageway through said second thread protector being shorter than said passageway through said first thread protector.

* * * * *